United States Patent
Jaradi et al.

(10) Patent No.: US 10,232,740 B1
(45) Date of Patent: Mar. 19, 2019

(54) ADJUSTABLE SEATBACK RECLINE ANGLE AND WARNING SYSTEM

(71) Applicant: Ford Global Technologies, LLC, Dearborn, MI (US)

(72) Inventors: Dean M. Jaradi, Macomb, MI (US); Michael James Andrus, Northville, MI (US); S. M Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/912,679

(22) Filed: Mar. 6, 2018

(51) Int. Cl.
  *B60Q 3/00* (2017.01)
  *B60N 2/02* (2006.01)
  *B60N 2/20* (2006.01)
  *B60N 2/90* (2018.01)

(52) U.S. Cl.
  CPC ............ *B60N 2/0244* (2013.01); *B60N 2/20* (2013.01); *B60N 2002/0272* (2013.01); *B60N 2002/981* (2018.02)

(58) Field of Classification Search
  CPC B60N 2002/0272; B60N 2/0245; B60N 2/08; B60N 2/0881; B60N 2/123; B60N 2/0228; B60N 2/06; B60N 2/2851; B60N 2/0252; B60N 2/0818; B60N 2/0837; B60N 2/0862; B60N 2/16; B60N 2/1615; B60N 2/18; B60N 2/2806; B60N 2/2812; B60N 2/2863; B60N 2/2872; B60N 2/42; B60N 2/4214; B60N 2/42736; B60N 2002/0236; B60N 2002/2815; B60N 2002/2818; B60N 2/0244; B60N 2/265; B60N 2/2809; B60N 2/2821; B60N 2/286; B60N 2/2875; B60N 2/2881; B60N 2/2887; B60N 2/2893; B60R 2022/4666; B60R 22/105; B60R 22/3416; B60R 22/46
  USPC .... 340/438, 446, 436, 457.1, 463, 467, 488, 340/524, 539.22, 571, 683
  See application file for complete search history.

(56) References Cited

U.S. PATENT DOCUMENTS

| | | | |
|---|---|---|---|
| 6,182,783 B1 | 2/2001 | Bayley | |
| 6,478,373 B1 | 11/2002 | Hake et al. | |
| 7,195,092 B2 | 3/2007 | Wu et al. | |
| 7,387,184 B2 * | 6/2008 | Bethge | B60N 2/42736 180/268 |

(Continued)

*Primary Examiner* — Daniel Previl
(74) *Attorney, Agent, or Firm* — Vichit Chea; Price Heneveld LLP

(57) ABSTRACT

A method of correcting a seatback recline angle is provided. The method includes a vehicle seat having a seat portion and a seatback portion, wherein the seatback portion is configured to recline to a plurality of reclined positions. The method further includes the steps of (a) measuring a recline angle of a seatback; (b) comparing the recline angle of the seatback to a predetermined recline angle threshold; (c) determining if the recline angle exceeds the recline angle threshold; (d) providing a warning to a seat occupant when the recline angle exceeds the recline angle threshold, wherein the warning is configured to prompt a corrective action from the seat occupant; and (e) moving the seatback to a corrected position when the corrective action from the seat occupant is not received after a predetermined period of time.

17 Claims, 6 Drawing Sheets

(56) References Cited

U.S. PATENT DOCUMENTS

| | | | | |
|---|---|---|---|---|
| 7,478,873 | B2* | 1/2009 | Al-Samarae | B60N 2/0232 297/216.1 |
| 8,818,644 | B1* | 8/2014 | Fujii | B60N 2/002 701/45 |
| 2006/0071527 | A1* | 4/2006 | Park | B60N 2/08 297/378.12 |
| 2012/0075464 | A1* | 3/2012 | Derenne | A61B 5/0013 348/135 |
| 2014/0062146 | A1* | 3/2014 | Haut | B62B 9/20 297/183.1 |
| 2015/0039047 | A1* | 2/2015 | Parker | A61N 1/37247 607/46 |
| 2015/0279187 | A1* | 10/2015 | Kranz | G08B 21/0415 340/539.12 |
| 2017/0128296 | A1* | 5/2017 | Kostic | A61G 7/0527 |

* cited by examiner

ADJUSTABLE SEATBACK RECLINE ANGLE AND WARNING SYSTEM

FIELD OF THE INVENTION

The present invention generally relates to a seat assembly for a vehicle, and more particularly to a seat assembly having the ability to warn sat occupants and adjust a seatback angle when a measured seatback angle is outside of an allotted range.

BACKGROUND OF THE INVENTION

Automobiles use various safety devices to provide protection for vehicle occupants. These includes driver or passenger airbags, side airbags, curtain bags, seatbelts, and the like. These features are designed for optimum use considering representative human anthropological forms, particular nominal position of seat in the seat track and a specific seatback angle position, often called the "design seatback angle." The safety design is built around various tolerances (i.e. minimum and maximum seat track or seatback angle). Deviation from the allotted ranges is considered "out of position" seat locations, and may result in less than optimal protection. The seatback angle is an important consideration in the design of a vehicle's safety system, particularly as it relates to driver or passenger airbags, seatbelt load limiter or pre-tensioning mechanisms. These systems provide optimal safety performance when the seatback angle is within a specified range above or below the design seatback angle. If the seatback angle is larger than the maximum design specification, safety of the front occupants may be compromised. Often times, owner's manuals specifically warn vehicle occupants not to recline their seats outside the allotted range. Most occupants do not read owner's manuals carefully, and there are no display systems to relay a reclined angle to the vehicle occupants. Thus, vehicle occupants have no way of determining with any degree of accuracy the angle of their seatback. Thus, a system having the following features is desired: 1) ability to measure the angle of the seatback automatically; 2) warn seat occupants when the recline angle of their seatback exceeds an allotted range; 3) return the seatback to the allotted range if corrective action is not taken by the seat occupant.

SUMMARY OF THE INVENTION

According to one aspect of the present invention, a vehicle seat assembly includes a seat portion and a seatback pivotally coupled to the seat portion. A sensor is operably coupled to the seatback for measuring a recline angle of the seatback. A controller is configured to monitor the recline angle of the seatback. A warning system is operably coupled to the controller for sending an alert to a seat occupant when the recline angle of the seatback exceeds a predetermined recline angle threshold.

Embodiments of the first aspect of the invention can include any one or a combination of the following features:
  wherein the sensor includes a digital protractor;
  wherein the alert includes one of an audio indication, a visual indication, a mechanical indication and a combination thereof;
  wherein the vehicle seat includes a frame assembly having a seatback portion, and further wherein the sensor is coupled to the seatback portion of the frame assembly;
  and
  wherein the actuator is controlled by the controller and configured to automatically move the seatback, such that the recline angle of the seatback is below the predetermined recline angle threshold.

According to another aspect of the present invention, a method of providing a seatback recline warning system for a motor vehicle, includes the following steps: measuring a recline angle of a seatback; comparing the recline angle to a recline angle threshold; determining if the recline angle exceeds the recline angle threshold; and moving the seatback towards the recline angle threshold when the recline angle exceeds the recline angle threshold.

Embodiments of the second aspect of the invention can include any one or a combination of the following features or steps:
  wherein the measuring of the recline angle includes using a position sensor;
  wherein the position sensor includes a digital protractor;
  wherein the recline angle of the seatback is continuously measured while the motor vehicle is in a drive condition;
  wherein the step of comparing the recline angle to a recline angle threshold further includes using a controller to compare the recline angle of the seatback to the recline angle threshold;
  wherein the recline angle threshold is a fixed value based on a preferred recline angle preset by the controller;
  wherein the recline angle threshold is 30 degrees reclined from the preferred recline angle;
  wherein the step of moving the seatback towards the recline angle threshold further includes using an actuator to move the seatback to a position that is below the recline angle threshold;
  wherein the recline angle threshold is 30 degrees reclined from the preferred recline angle, and further wherein the actuator automatically moves the recline angle of the seatback to the recline angle threshold when a corrective action from a seat occupant is not initiated; and
  providing a warning to a seat occupant when the recline angle exceeds the recline angle threshold; and moving the seatback to a reclined position at or below the recline angle threshold when a response from the seat occupant is not received after a predetermined period of time.

According to another aspect of the present invention, a method of correcting a seatback recline angle includes the following steps: measuring a recline angle of a seatback; comparing the recline angle of the seatback to a predetermined recline angle threshold; determining if the recline angle exceeds the recline angle threshold; providing a warning to a seat occupant when the recline angle exceeds the recline angle threshold, wherein the warning is configured to prompt a corrective action from the seat occupant; and moving the seatback to a corrected position when the corrective action from the seat occupant is not received after a predetermined period of time.

Embodiments of the third aspect of the invention can include any one or a combination of the following features:
  wherein the warning includes one of an audio indication, a visual indication, a readable visual indication, a mechanical indication and a combination thereof;
  wherein the step of moving the seatback to the corrected position further includes using an actuator to automatically move the seatback to a position that is below the recline angle threshold;

stopping movement of the seatback when the corrected position is reached; and wherein the corrected position correlates to a recline angle that is 30 degrees or less from the predetermined recline angle threshold.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
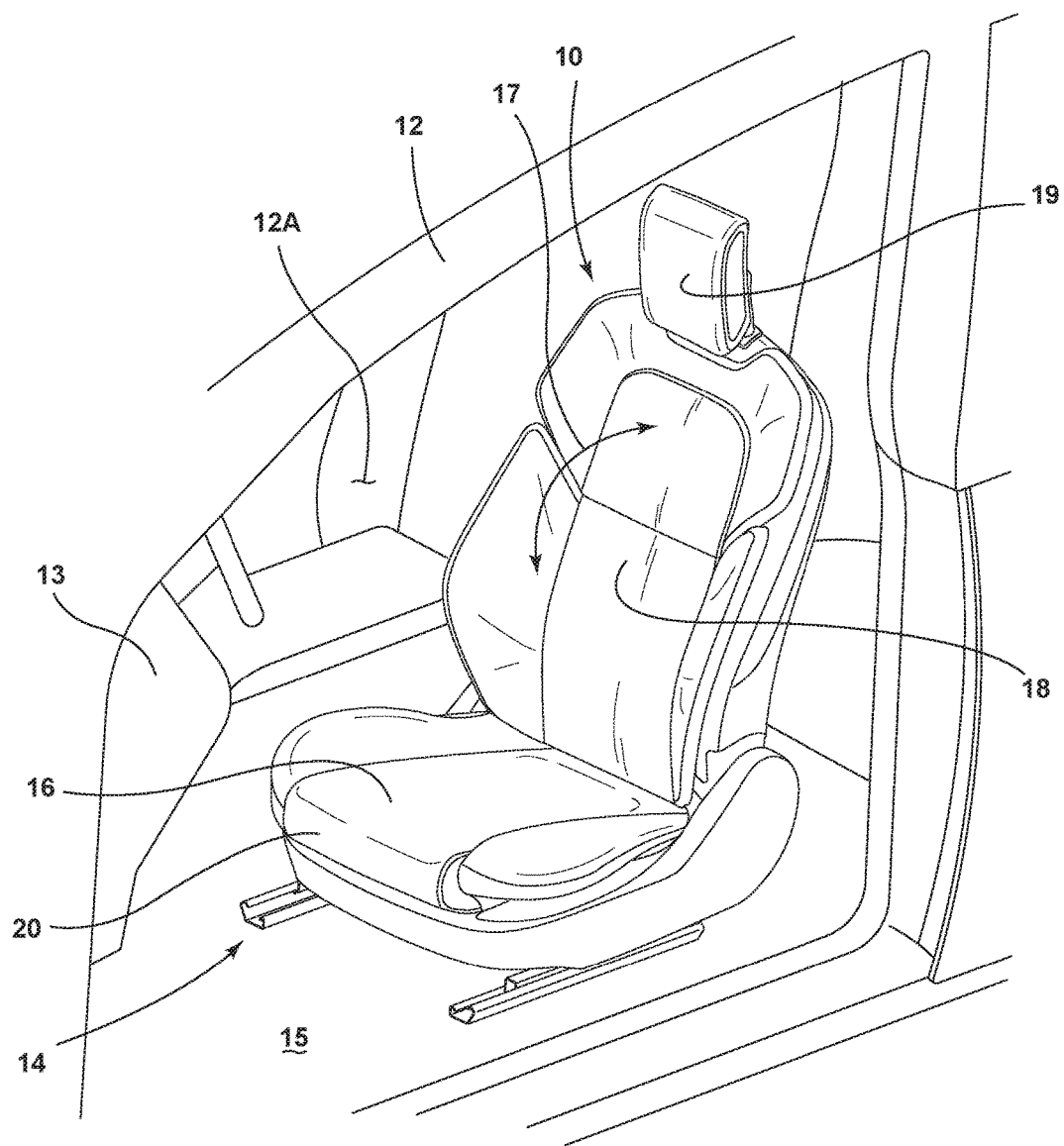
FIG. 1 is a top perspective view of a seat assembly disposed within a vehicle interior, according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed in other seat assemblies positioned in other areas of a vehicle interior, such as the passenger side seating area, a rear seating area, or a third row seating option. The seat assembly 10 is supported on a track system 14 disposed on a vehicle floor support surface 15, and generally includes a substantially horizontal seat portion 16 and a substantially upright seatback 18. A headrest assembly 19 is disposed near an upper portion of the seatback 18. It is contemplated that the seatback 18 is a pivoting member configured for pivotal movement relative to the seat portion 16 along the path as indicated by arrow 17, as further described below. The various parts of the seat portion 16 and seatback 18 shown in FIG. 1 are covered with an upholstered seat cover 20. The seat cover 20 is contemplated to be comprised of a suitable natural or synthetic material, or any combination thereof, that generally covers the cushion materials and frame components of the seat assembly 10.

Figure 2:
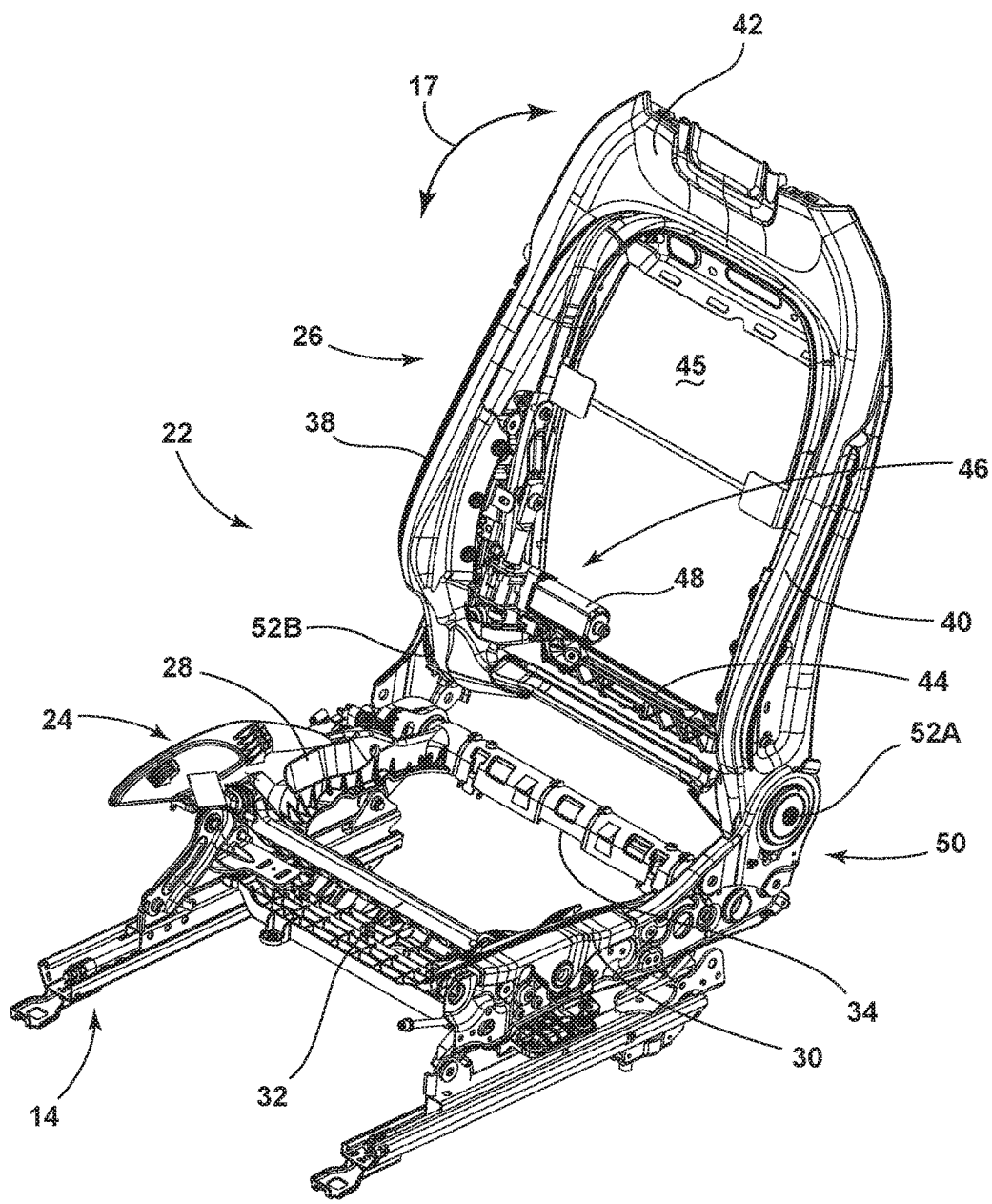
FIG. 2 is a top perspective view of a seat frame assembly having a seat portion and a seatback with component parts for reclining the seatback.

Referring now to FIG. 2, a seat frame assembly 22 is shown having a seat portion 24 and a seatback portion 26. The seat portion 24 includes first and second side portions 28, 30 that are spaced apart from one another and interconnected by front and rear cross members 32, 34. The seatback portion 26 includes first and second side members 38, 40 that are spaced apart from one another and are interconnected by upper and lower cross members 42, 44. Together, the seat portion 24 and seatback portion 26 of the seat frame assembly 22 are configured to support the seat portion 16 and seatback 18 of the seat assembly 10 (FIG. 1). As further shown in FIG. 2, a powered adjustment system 46 includes an actuator 48 coupled to the seatback portion 26 for movement of the seatback portion 26 relative to the seat portion 24 along the path as indicated by arrow 17. The pivoting movement of the seatback portion 26 relative to the seat portion 24 is provided by a reclining system 50 having recliner hearts 52A, 52B. Together, the recliner hearts 52A, 52B operably connect the seat portion 24 with the seatback portion 26 and may be interconnected by a tie-rod or other like cross member extending between the recliner hearts 52A, 52B along the lower cross member 44 of the seatback portion 26. In use, the powered adjustment system 46 provides powered pivoting movement of the seatback portion 26 relative to the seat portion 24 using the recliner system 50 and the actuator 48. It is further contemplated that the seatback portion 26 can be manually adjustable using a release lever that is integrated with the recliner system 50.

Figures 3A, 3B:
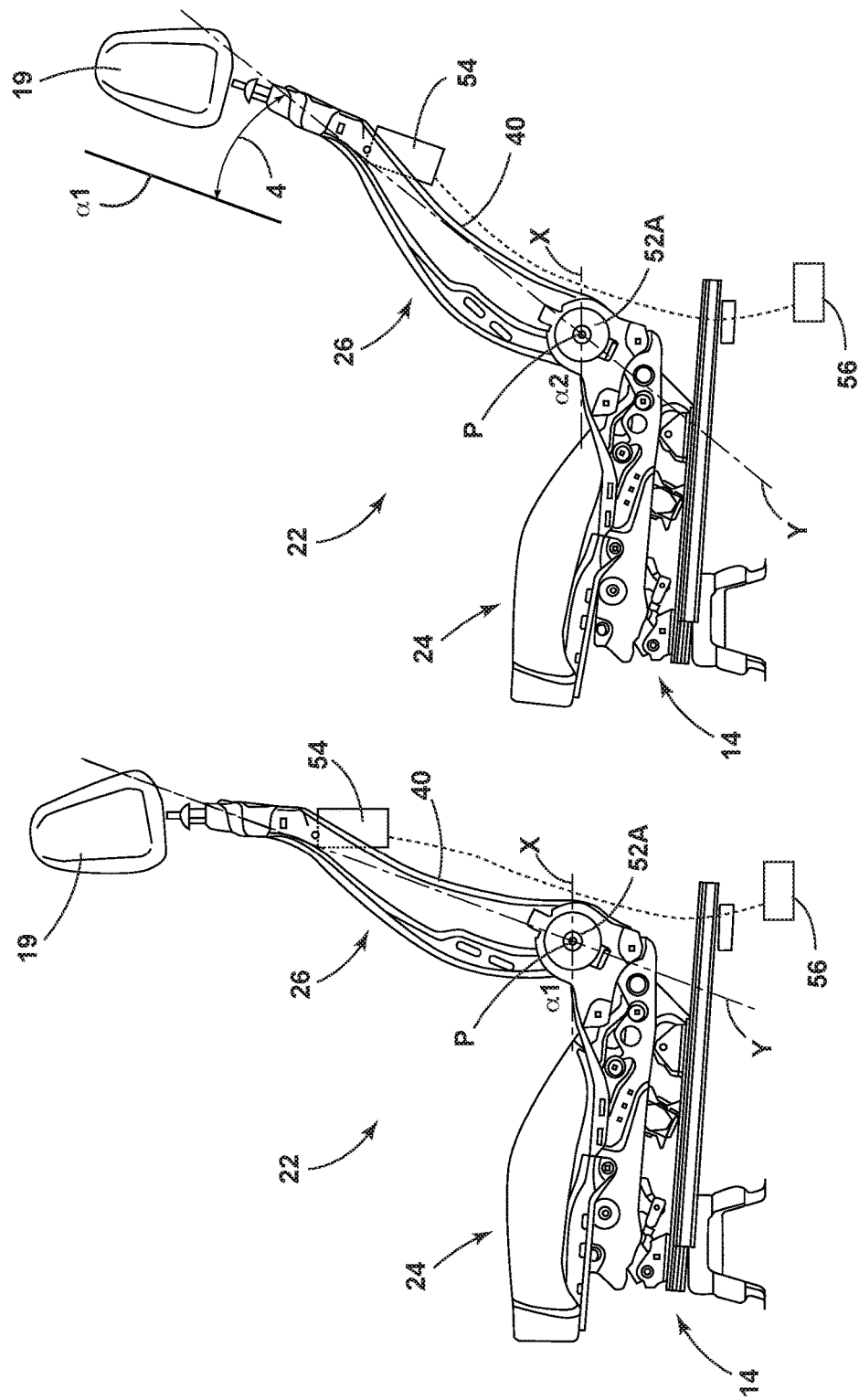
FIG. 3A is a side elevational view of the seat frame assembly of FIG. 2 showing a seatback portion disposed at a first angle.
FIG. 3B is a side elevational view of the frame assembly of FIG. 3A showing the seatback portion disposed at a second angle.

Referring now to FIG. 3A, the seatback portion 26 of the frame assembly 22 is shown in an up-right use position. Specifically, in FIG. 3A, the seatback portion 26 is disposed at a first angle 1 relative to a horizontal position indicated by the X axis. With the seatback portion 26 disposed at the first angle 1, the seatback portion 26 is contemplated to be disposed at an up-right use position that is optimal for supporting a vehicle occupant in an preferred position for the proper execution of vehicle safety features. The first angle 1 of the seatback portion 26 shown in FIG. 3A can be referred to herein as a preferred recline angle or design angle.

Referring now to FIG. 3B, the seatback portion 26 is shown disposed at a second angle 2 which is positioned at a greater rearward recline angle as compared to the first angle 1 of the seatback portion 26 shown in FIG. 3A. The angle of the seatback portion 26 is not calculated based on an angle of the seat portion 24, but rather based on the X axis which may be set at a level horizontal configuration. As noted above, it is recommended that the recline angle of the seatback portion 26 be no more than 30 degrees from the design angle (the first angle 1) depicted in FIG. 3A. Thus, a method of calculating the second angle 2 shown in FIG. 3B relative to the first angle 1 shown in FIG. 3A is necessary to determine whether or not a corrective action needs to be taken by a seat occupant with regards to the second angle 2 of the seatback portion 26 shown in FIG. 3B.

The present concept provides an automatic correction system that retains the seatback portion 26 in a preferred orientation based on the design angle (FIG. 3A), i.e. not to exceed 30 degrees of recline from the first angle 1. Most driver and passenger seats have seat control modules that allow seat occupants to recline their seats by actuation button controls. With the present concept, the recline angle of the seatback portion 26 is continuously measured and monitored by a seat control module. The seat control module is identified as reference numeral 56 in FIGS. 3A-3C. As used with the present concept, the control module 56 will have a predetermined input for the design seatback angle, such as first angle 1. When a seat occupant reclines his or her seatback portion 26, the control module 56, in continuingly monitoring the position of the seatback portion 26, will measure recline angle to which the seatback portion 26 is adjusted, such as second angle 2 shown in FIG. 3B, and calculate the difference ($\alpha 2 - \alpha 1$). If no seat control module is present, as the case may be with manually reclining seats, an angle measuring sensor or position sensor 54, can be integrated with the seatback portion 26 to measure a current seatback angle and calculate the difference between the current recline angle and the design angle. The angle measuring sensor 54 can be a digital protractor that is integrated into the seatback reclining joint, or can be positioned anywhere on the seatback portion 26. The associated calculation between the current seatback position and the design angle 1 includes an algorithm for use with the present concept that is depicted in the chart of FIG. 4, and further described below.

Figure 3C:
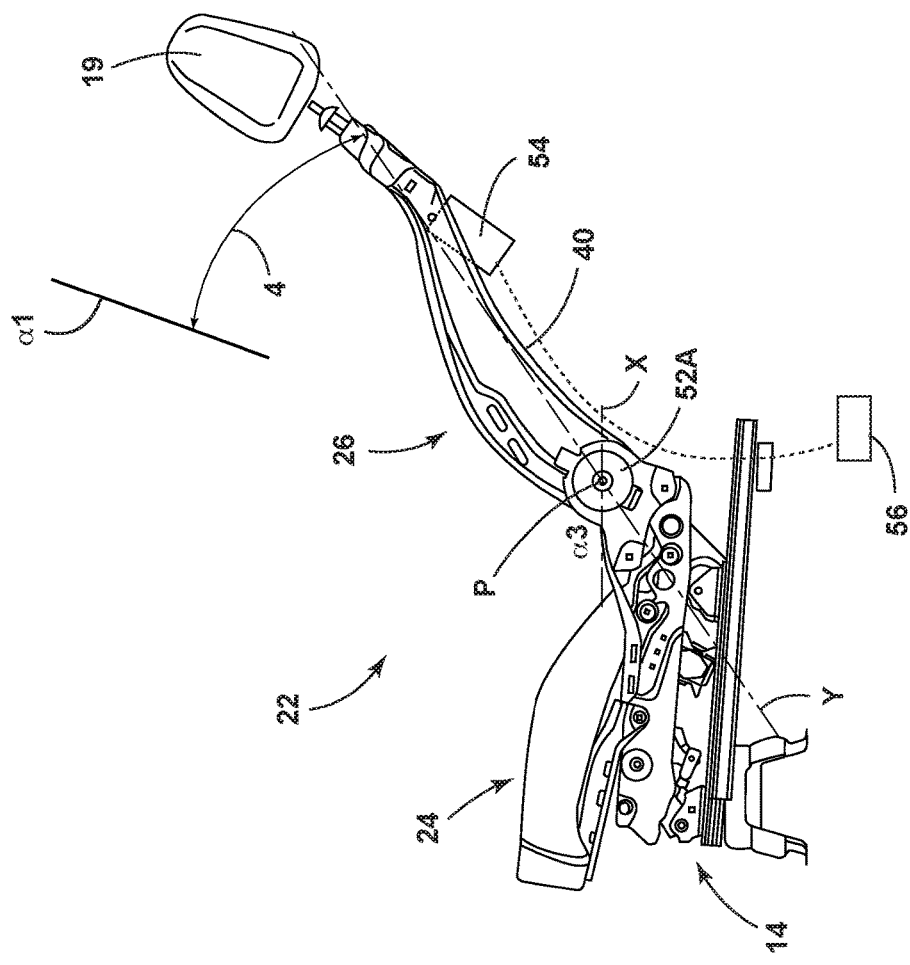
FIG. 3C is a side elevational view of the frame assembly of FIG. 3A showing the seatback portion disposed at a third angle.

Referring now to FIG. 3C, the seatback portion 26 is shown disposed at a third angle 3 which is positioned at a greater rearward recline angle than second angle 2 (FIG. 3B) which is further reclined than the first angle 1 (FIG. 3A). As noted above, it is recommended that the recline angle of the seatback portion 26 be no more than 30 degrees from the design angle (the first angle 1) depicted in FIG. 3A. Thus, with reference to FIGS. 3A-3C, the design angle is shown in FIG. 3A as first angle 1, another recline angle is shown in FIG. 3B as second angle 2, and yet another recline angle is shown in FIG. 3C as third angle 3. It is contemplated that the recline angle of the second angle 2 (FIG. 3B) is just within a predetermined recline angle threshold, such that corrective action is not needed. Thus, the difference in the second angle 2 and the design angle 1 is contemplated to be 30 degrees or less, and therefore below the threshold. This difference is indicated at reference numeral 4. However, it is contemplated that the recline angle of the third angle 3 (FIG. 3C) exceeds the predetermined recline angle threshold, which, as noted above, is 30 degrees, further reclined than the design angle 1 illustrated in FIG. 3A. Thus, the difference 4 in the third angle 3 and the design angle 1 is contemplated to be greater than 30 degrees, thereby exceeding the threshold. Thus, in the embodiment illustrated in FIG. 3C, the difference 4 necessitates corrective action by the seat occupant. The system of the present concept, is contemplated to provide a warning or alert to the seat occupant when the difference 4 is greater than 30 degrees between current and design recline angles.

Figure 4:
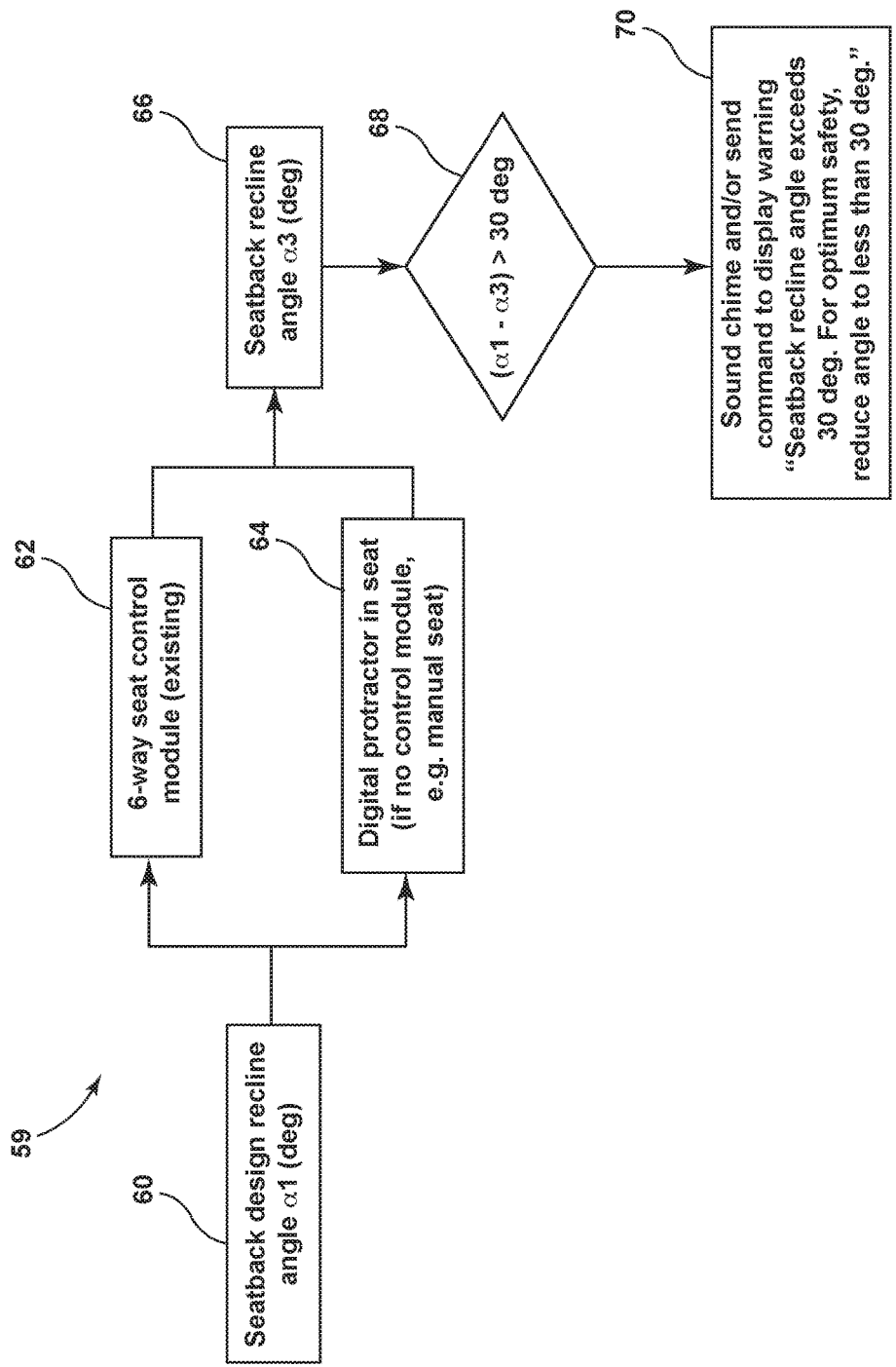
FIG. 4 is a flow chart representing a seatback angle monitoring system.

With reference to FIG. 4, an algorithm 59 is shown, wherein a seatback design angle 1 (FIG. 3A) is preset as a predetermined value in a controller. The controller can be integrated into control module 56 or can be a separate controller in communication with control module 56. The control module 56 is contemplated to be part of an adjustable seat system, such as a 6-way adjustable seat system known in the art. Thus, as shown in FIG. 4, the seatback design angle 1 is preset in the controller at step 60. The seatback portion 26 includes a control module 56 or includes a position sensor 54 as shown in steps 62 and 64, respectively. The seatback 26 is then adjusted by a seat occupant from the design angle 1 to the third recline angle 3 shown in FIG. 3C and illustrated in step 66 of FIG. 4. In step 68 of FIG. 4, the current recline angle (set at recline angle 3 of FIG. 3C) is compared to the design recline angle 1 and the calculation shown in step 68 of FIG. 4 is performed to determine if the current recline angle exceeds a recline angle threshold. As noted above the recline angle threshold is contemplated to be a fixed value which is exceeded when a recline angle is measured to be, for example, more than 30 degrees from the design recline angle 1. As recline angle 3 (FIG. 3C) is determined to be greater than design recline angle 1 (FIG. 3A) by more than 30 degrees thus exceeding the threshold, the calculation of step 68 of algorithm 59 induces the controller to initiate a warning to the seat occupant in step 70.

It is contemplated that the warning or alert of step 70 can be delivered to a seat occupant in various forms. The warning or alert may include an audio indication (a beep sound or tonal indicator), a visual indication (illuminating a warning light or symbol on an instrument panel or providing a readable message on an LCD screen of a driver information system), a mechanical indication (such as a seat vibration or steering wheel vibration), or any combination thereof. No matter the delivery system of the warning, once the warning/alert is delivered, the seat occupant will have a predetermined period of time to initiate a corrective action before automatic corrective action is taken by the present system, as further described below.

As noted above, and shown in FIG. 4, the algorithm 59 will obtain the recline angle from the seat control module 56 or directly from the angle measuring sensor 54 (such as a digital protractor) in the case of a manually adjustable seat. A driver information system that controls messaging/warnings through an LCD monitor can be in communication with the seat control module 56 either by a wired connection or using a wireless connection system to deliver the warning in step 70. An algorithm 71 for the seat control module 56 to send a warning, alert or corrective command to the driver information system is illustrated in FIG. 5, and further described below.

Figure 5:
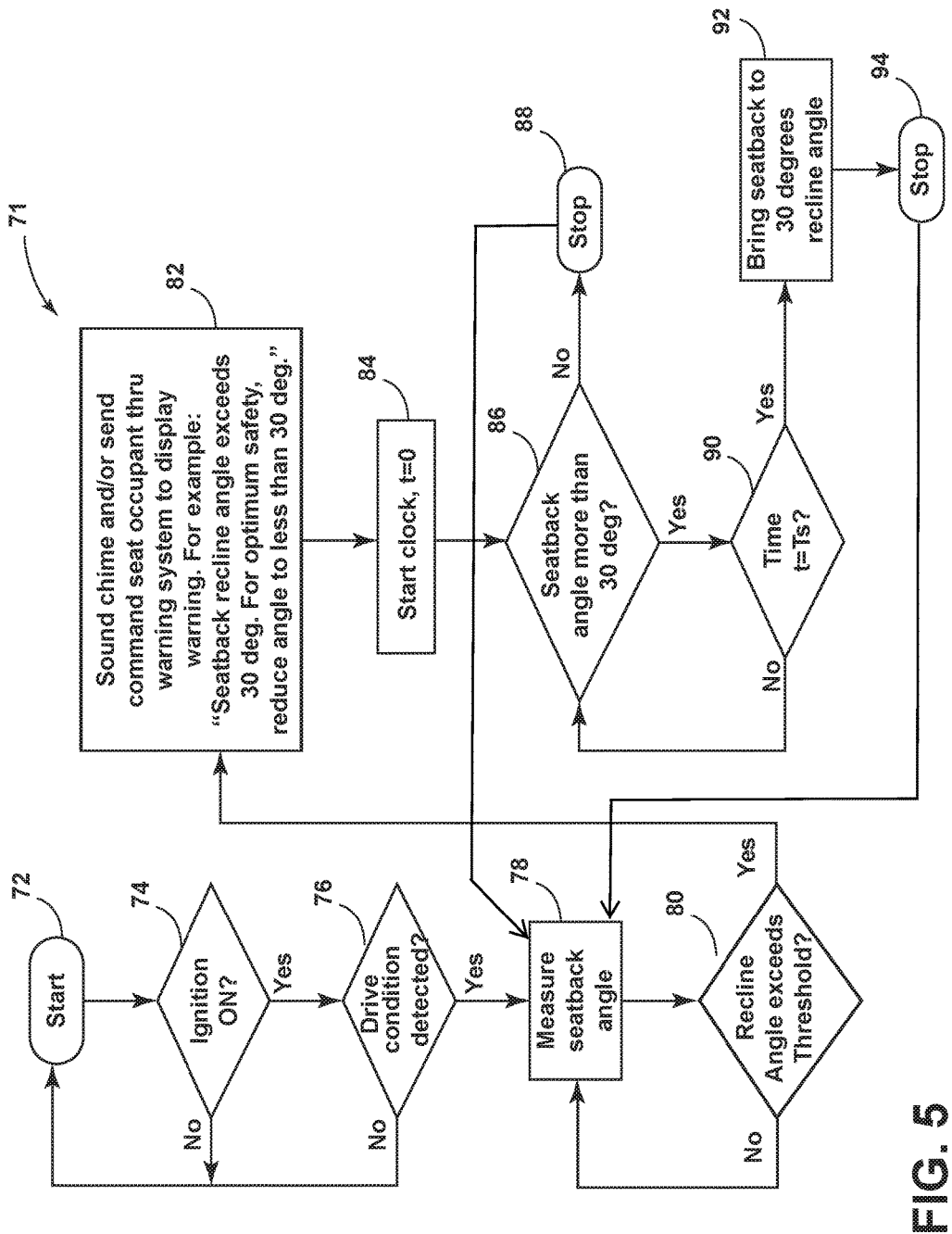
FIG. 5 is a flow chart representing a seatback angle monitoring system and maintenance system.

With specific reference to FIG. 5, the algorithm 71 provides an automatic response from the system if the warning is not heeded by the seat occupant within a predetermined period of time, Ts (e.g., 20 sec). Thus, if the seat occupant does not bring the seatback recline angle to within 30 degrees or less of the design angle 1 (FIG. 3A), the seat control module 56 will automatically activate to bring the seatback recline angle to 30 degrees from the design recline angle 1 in a seat assembly having a powered control system 46. It is contemplated that the corrective action initiated by the control module 56 will occur automatically, and will discontinue as soon as the current recline angle of the seatback portion 26 is below the predetermined seatback angle threshold. Thus, with the seatback portion 26 positioned beyond the threshold recline angle at the third angle 3 in FIG. 3C, the automatic corrective movement of the control module 56 will initiate if a corrective action is not first initiated by the seat occupant. The automatic corrective movement of the system will not begin until after a predetermined period of time Ts has passed since a warning was issued to the seat occupant. The control module 56 will initiate a seatback movement sequence to get the seatback portion 26 moving towards the predetermined seatback angle threshold. However, in the present system, the seatback portion 26 will not move all the way forward to the design angle (angle 1 in FIG. 3A), but rather, the seatback 26 will pivot forward to the first position that is 30 degrees from the design angle 1. This first position may be the second angle 2 shown in FIG. 3B if that second angle 2 is below the predetermined seatback angle threshold.

With further reference to FIG. 5, the example algorithm 71 shows that the process of the present system can start at a first step 72 by detecting if the vehicle ignition is ON (step 74). If the vehicle ignition is not ON, the algorithm will start over. If the vehicle ignition is detected as being ON, the algorithm will look for a drive condition in step 76. The drive condition can be any condition that alerts the system of current or possible movement of the vehicle, when proper recline angle is most critical. A drive condition may include the vehicle being in motion, the vehicle being in a drive gear, or any other indication that the vehicle is moving or about to move. If a drive condition is detected in step 76, the algorithm will go on to measure the seatback angle in step 78. After measuring the seatback recline angle in step 78, the algorithm 71 determines if that seatback recline angle exceeds a predetermined recline angle threshold in step 80. As noted above, the predetermined recline angle may be 30 degrees more than the predetermined design angle, or can be any other threshold amount configured by the manufacturer and preset and controlled by the controller. If the recline angle measured in step 78 does not exceed the predetermined threshold, the algorithm 71 calls for the recline angle to be measured again (step 78). In this way, the algorithm 71 of the present concept provides for continuous monitoring of the seatback angle. The continuous monitoring of the seatback angle may be contingent on the ignition being ON (step 74) and a drive condition being detected (step 76).

As further shown in FIG. 5, if it is determined that the seatback recline angle exceeds the seatback recline angle threshold in step 80, the algorithm 71 calls for a warning or alert to be delivered to the seat occupant as indicated in step 82. The warning or alert can be delivered in one of the various forms noted above and may call for a corrective action by the seat occupant, such as "reduced recline angle." In one form of the algorithm 71 exemplified in FIG. 5, the algorithm 71 may start a clock or timer in step 84. The controller will monitor if a corrective action has been taken by the seat occupant to move the seatback to a corrected position within 30° of the design angle. Thus, in step 86, while the timer is running, the algorithm 71 provides for a seatback angle measurement to determine if the seatback is positioned below the predetermined recline threshold. If the seatback recline angle measured in step 86 no longer exceeds a predetermined recline angle threshold, algorithm 71 calls for the timer to stop in step 88. Once the timer has stopped, the algorithm 71 will return to measuring the seatback angle as found in step 78 to provide continuous monitoring of the seatback angle. If it is determined that the seatback angle still exceeds the predetermined recline angle threshold, the algorithm 71 will look to the clock or timer to see if a predetermined amount of time Ts has passed in step 90. As noted above, the predetermined amount of time Ts can be preset by the manufacturer and controlled by the controller. It is contemplated that a period of about 20 seconds will suffice for use with the algorithm 71 of the present concept. If the predetermined amount of time Ts has not passed, the seatback recline angle will again be measured in step 86 to determine if the seatback recline angle exceeds the predetermined recline angle threshold. Thus, step 86 calls for corrective action of the seat occupant to bring the seatback to a corrected position that is any recline angle that is below the predetermined recline angle threshold (i.e. 30 degrees or less from the recline angle threshold). If the seatback is still positioned at an angle that exceeds the predetermined recline angle threshold, and the predetermined time period Ts for correction has passed, the algorithm 71 calls for automatic corrective action by the control module or controller for the seat assembly. The corrective action by the controller is indicated in step 92, wherein the seatback is raised to a reclined position that is below the predetermined recline angle threshold. Once the seatback angle is determined to be below the predetermined recline angle threshold, movement of the pivoting seatback will cease as indicated in step 94. After movement of the seatback has ceased, the algorithm 71 will again revert to measuring the seatback angle at step 78 to provide for continuous monitoring of the seatback recline angle.

In vehicle seats that do not include a powered seatback recline system, such as powered adjustment system 46 (FIG. 2), the algorithm may call for a corrective action from the seat occupant by issuing a warning to the seat occupant. This warning is contemplated to come through a warning system to which the position sensor, such as position sensor 54 (FIG. 3A), is operably coupled. The warning can be a progressive warning that starts as a bead, and progresses to a series of rapid beeps that persists until the seat occupant manually adjusts the seatback angle to a recline angle that is below the predetermined recline angle threshold. The progressive warning may include any of the types of warnings identified above for indicating to a seat occupant that corrective action is required.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly, comprising:
   a seat portion;
   a seatback pivotally coupled to the seat portion;
   a frame assembly having a seatback portion disposed within the seatback;
   a sensor operably coupled to the seatback portion of the frame assembly for measuring a recline angle of the seatback;
   a controller configured to monitor the recline angle of the seatback;
   an actuator coupled to the seatback portion of the frame assembly, wherein the actuator is controlled by the controller and configured to automatically move the seatback, such that the recline angle of the seatback is below the predetermined recline angle threshold; and
   a warning system operably coupled to the controller for sending an alert to a seat occupant when the recline angle of the seatback exceeds a predetermined recline angle threshold.

2. The seat assembly of claim 1, wherein the sensor includes a digital protractor.

3. The seat assembly of claim 1, wherein the alert includes one of an audio indication, a visual indication, a mechanical indication and a combination thereof.

4. A method of providing a seatback recline warning system for a motor vehicle, comprising:
   measuring a recline angle of a seatback;
   comparing the recline angle to a recline angle threshold;
   determining if the recline angle exceeds the recline angle threshold; and
   moving the seatback towards the recline angle threshold to a position that is below the recline angle threshold using an actuator, when the recline angle exceeds the recline angle threshold.

5. The method of claim 4, wherein the measuring of the recline angle includes using a position sensor.

6. The method of claim 5, wherein the position sensor includes a digital protractor.

7. The method of claim 4, wherein the recline angle of the seatback is continuously measured while the motor vehicle is in a drive condition.

8. The method of claim 4, wherein the step of comparing the recline angle to a recline angle threshold further includes using a controller to compare the recline angle of the seatback to the recline angle threshold.

9. The method of claim 8, wherein the recline angle threshold is a fixed value based on a preferred recline angle preset by the controller.

10. The method of claim 9, wherein the recline angle threshold is 30 degrees reclined from the preferred recline angle.

11. The method of claim 4, wherein the recline angle threshold is 30 degrees reclined from the preferred recline angle, and further wherein the actuator automatically moves the recline angle of the seatback to the recline angle threshold when a corrective action from a seat occupant is not initiated.

12. The method of claim 4, including:
providing a warning to a seat occupant when the recline angle exceeds the recline angle threshold; and
moving the seatback to a reclined position at or below the recline angle threshold when a response from the seat occupant is not received after a predetermined period of time.

13. A method of correcting a seatback recline angle, comprising:
measuring a recline angle of a seatback;
comparing the recline angle of the seatback to a predetermined recline angle threshold;
determining if the recline angle exceeds the recline angle threshold;
providing a warning to a seat occupant when the recline angle exceeds the recline angle threshold, wherein the warning is configured to prompt a corrective action from the seat occupant; and
moving the seatback to a corrected position when the corrective action from the seat occupant is not received after a predetermined period of time.

14. The method of claim 13, wherein the warning includes one of an audio indication, a visual indication, a readable visual indication, a mechanical indication and a combination thereof.

15. The method of claim 13, wherein the step of moving the seatback to the corrected position further includes using an actuator to automatically move the seatback to a position that is below the recline angle threshold.

16. The method of claim 15, including:
stopping movement of the seatback when the corrected position is reached.

17. The method of claim 13, wherein the corrected position correlates to a recline angle that is 30 degrees or less from the predetermined recline angle threshold.

* * * * *